United States Patent [19]

Wakamiya

[11] Patent Number: 4,553,229
[45] Date of Patent: Nov. 12, 1985

[54] APPARATUS FOR READING INFORMATION

[75] Inventor: Shunichiro Wakamiya, Tokyo, Japan

[73] Assignee: Asahi Kogaku Kogyo Kabushiki Kaisha, Tokyo, Japan

[21] Appl. No.: 492,315

[22] Filed: May 6, 1983

[30] Foreign Application Priority Data

May 8, 1982 [JP] Japan .................................. 57-75967

[51] Int. Cl.$^4$ .............................................. G11B 7/00
[52] U.S. Cl. .................................................. 369/110
[58] Field of Search .................... 369/46, 44, 45, 110, 369/111, 112, 121; 350/288, 292

[56] References Cited

U.S. PATENT DOCUMENTS

| | | | |
|---|---|---|---|
| 4,100,577 | 7/1978 | Naruse et al. | 369/110 |
| 4,139,263 | 2/1979 | Lehureau et al. | 369/110 |
| 4,312,570 | 1/1982 | Southwell | 350/288 |
| 4,322,130 | 3/1982 | Ito et al. | 350/288 |

Primary Examiner—Donald McElheny, Jr.
Attorney, Agent, or Firm—Sughrue, Mion, Zinn, Macpeak, and Seas

[57] ABSTRACT

An apparatus for reading information from an optical recording medium includes a laser beam source, a beam splitter, and a fixed mirror which is disposed in an optical path of a laser beam for reflecting the laser beam from the laser beam source to the beam splitter. The laser beam source is arranged so that a linearly polarized, light oscillating plane, which includes an optical axis as well as an oscillating direction of the laser beam, is perpendicular to a plane which includes a normal of the fixed mirror and the optical axis of the laser beam. In addition, the beam splitter is arranged so that a plane which includes a normal of a reflection plane of the beam splitter and the optical axis of the laser beam is parallel to the linearly polarized, light oscillating plane. According to this construction, attenuation of the laser beam is reduced.

8 Claims, 7 Drawing Figures

APPARATUS FOR READING INFORMATION

BACKGROUND OF THE INVENTION

1. Field of the Invention

The present invention relates to an information reading apparatus for reading information which has been recorded on an optical recording medium such as a video disk.

2. Description of the Prior Art

A conventional information reading apparatus is shown in FIG. 1. In FIG. 1, a linearly polarized laser source 2, fixed mirrors 3 and 4, a diffraction grating 5, a luminous flux enlarging lens 6, a beam splitter 7, a quarter wavelength or Q-section plate 8, movable mirrors 9 and 10, a condenser lens 11, and a light receiving element 12 are fixed on a platform 1. Under the platform 1 is an objective lens 13 and a disk 14 which serve as an optical recording medium. A laser beam, which is emitted from the linearly polarized laser source 2, is reflected by the fixed mirrors 3 and 4, passed through the beam splitter 7 and the Q-section plate 8, further reflected by the movable mirrors 9 and 10, and reaches the optical recording surface of the disk 14. The laser beam reflected from the optical recording surface of the disk 14 returns as information-carrying light by passing through the same optical path until it reaches the reflection surface 15 of the beam splitter 7. The laser beam is then reflected at the reflection surface 15 of the beam splitter 7, focused by the condenser lens 11, and converted into an electrical signal. To read efficiently from the disk 14, it is preferable to suppress the attenuation of the laser beam light as much as possible. Particularly, in the case in which the laser beam is reflected by fixed mirrors 3 and 4 for the sole purpose of changing the propagation direction of the laser beam and directing the laser beam toward the beam splitter 7, it is preferable to make every effort to prevent the amount of laser light from being unduly attenuated.

SUMMARY OF THE INVENTION

Accordingly, an object of the present invention is to provide an apparatus for reading information from an optical recording medium in which attenuation of laser beam light is suppressed and, in particular, reduced along that part of the optical path between the laser source and the beam splitter.

The present invention is based on the principle that, when a laser beam is reflected by a fixed mirror, the amount of laser beam light which is reflected by a fixed mirror is maximum when the linearly polarized, light oscillating plane (i.e., the plane which is defined by the optical axis of the laser beam and the oscillating direction of the laser beam) is perpendicular to a plane which includes a normal of the fixed mirror and the optical axis of the laser beam. On the other hand, the amount of laser beam light which is reflected by a fixed mirror is less than the maximum amount set forth above when the linearly polarized, light oscillating plane is parallel to the plane which includes the normal of the fixed mirror and the optical axis of the laser beam.

In the apparatus for reading information from an optical recording medium according to the present invention, a laser source is arranged so that the linearly polarized, light oscillating plane is perpendicular to a plane which includes the normal of a fixed mirror and the optical axis of the laser beam, and a beam splitter is arranged so that the plane which includes the normal of the reflection plane of the beam splitter and the optical axis of the laser beam is parallel to the linearly polarized, light oscillating plane.

DESCRIPTION OF THE PREFERRED EMBODIMENTS

Figure 1:
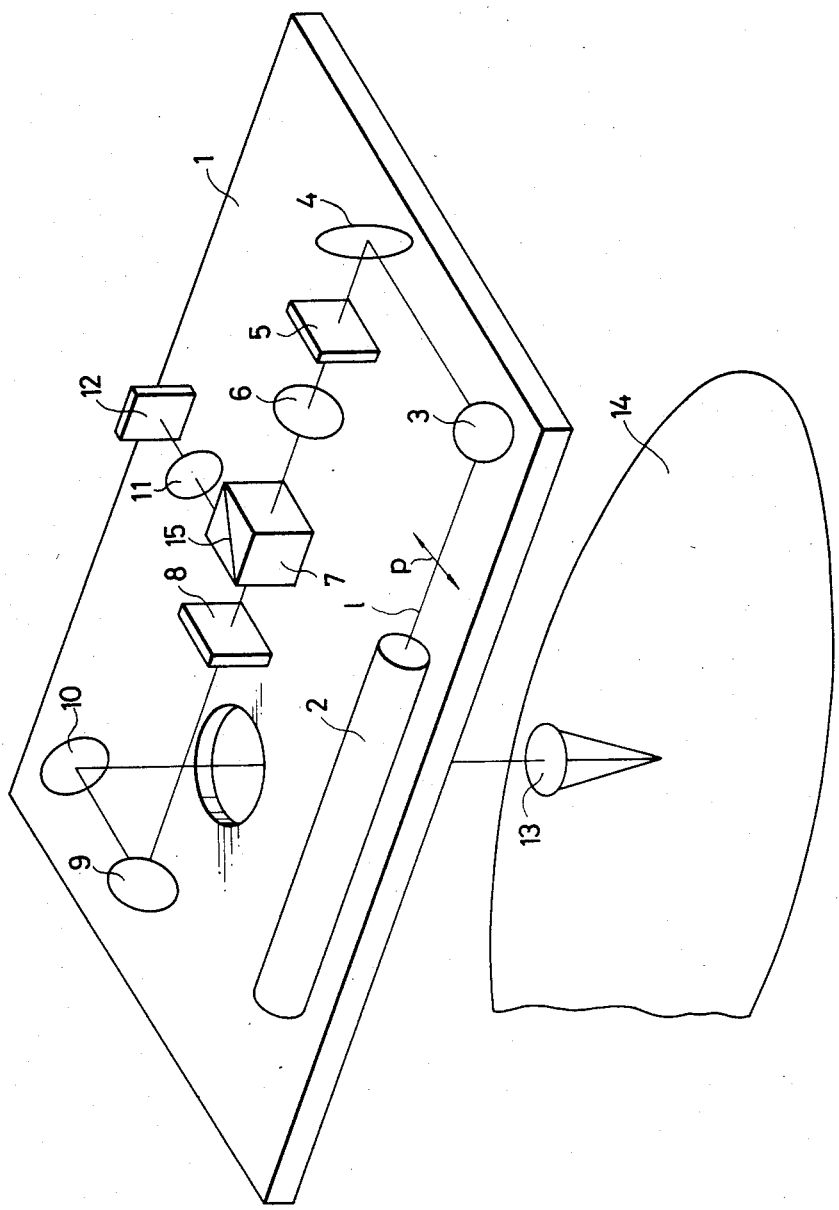
FIG. 1 is a diagram illustrating a conventional apparatus for reading information from an optical recording medium.
Figure 2:
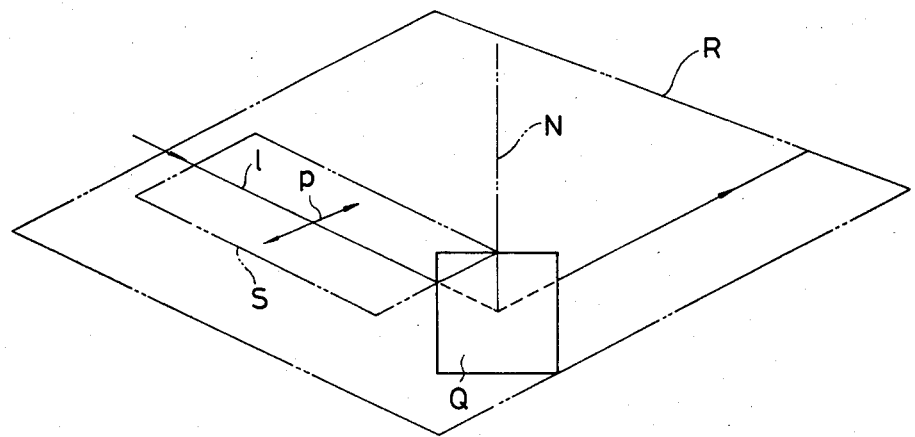
FIG. 2 is a diagram showing that the polarization reference plane of a fixed mirror shown in FIG. 1 is parallel to the linearly polarized, light oscillating plane of a laser beam shown in FIG. 1.

As shown in FIG. 2, a plane S, which includes the optical axis 1 and the oscillating direction P of a laser beam, is defined as the linearly polarized, light oscillating plane of the laser beam. A plane R, which includes a normal N of a reflection plane Q and the optical axis 1 of the laser beam, is defined as the polarization reference plane. In the conventional apparatus for reading information from an optical recording medium in FIG. 1, the polarization reference plane R is parallel to the linearly polarized, light oscillating plane S. On the other hand, in the apparatus for reading information from an optical recording medium according to the present invention, the polarization reference plane R of the fixed mirror is perpendicular to the linearly polarized, light oscillating plane S, and the polarization reference plane R of the beam splitter is parallel to the linearly polarized, light oscillating plane S.

Figure 4:
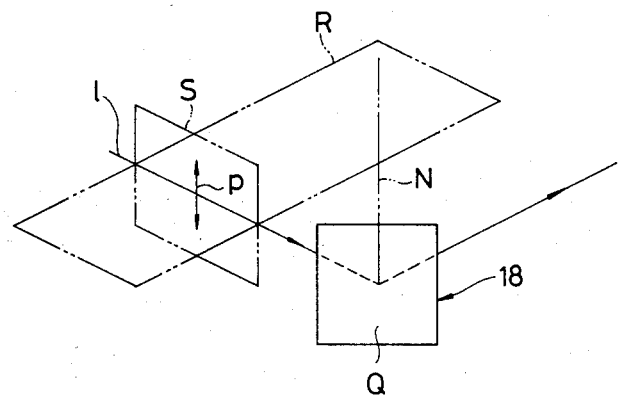
FIG. 4 is a diagram showing that the polarization reference plane of a fixed mirror shown in FIG. 3 is perpendicular to the linearly polarized, light oscillating plane of a laser beam shown in FIG. 3.
Figure 3:
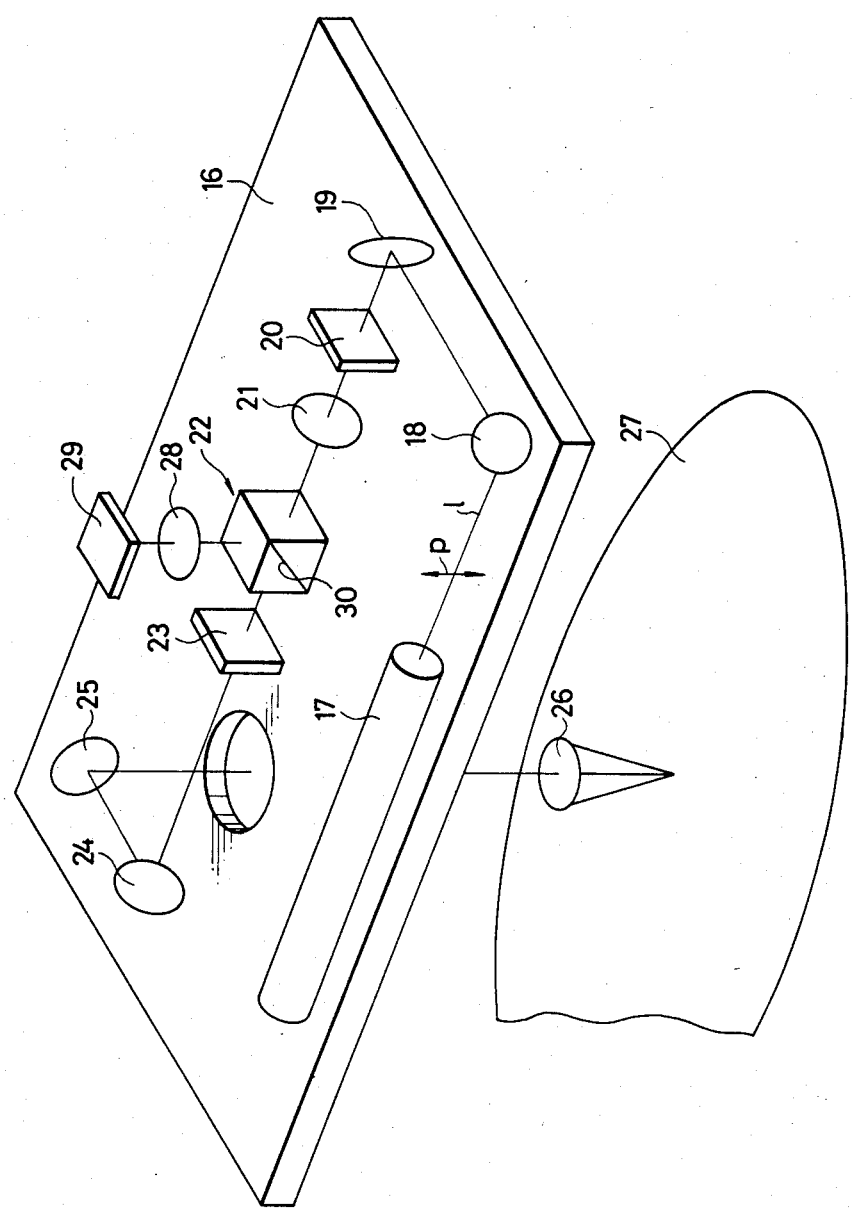
FIG. 3 is a diagram illustrating an embodiment of the apparatus for reading information from an optical recording medium according to the present invention.

In the embodiment of the present invention shown in FIG. 3, the apparatus for reading information from an optical recording medium comprises a platform 16; a linearly polarized laser beam source 17; fixed mirrors 18 and 19; a diffraction grating 20; a luminous, flux enlarging lens 21; a beam splitter 22; a Q-plate 23; movable mirrors 24 and 25; an objective lens 26; a disk which serves as an optical recording medium 27; a condenser lens 28; and a light receiving element 29. As shown in FIG. 4, the laser beam source 17 is mounted on the platform 16 in such a manner that the polarization reference plane R of the fixed mirror 18 is perpendicular to the linearly polarized, light oscillating plane S. In this embodiment, the linearly polarized laser beam which is emitted from the linearly polarized laser beam source 17 impinges on the reflection plane Q of the fixed mirror 18 with an incident angle of 45° with respect to a normal on the plane Q. The beam splitter 22 is arranged such that the polarization reference plane, which includes the normal of the reflection plane 30 of the beam splitter 22 and the optical axis of the linearly polarized laser beam, is parallel to the linearly polarized, light oscillating plane. The linearly polarized laser beam which passes through the beam splitter 22 is converted into a circularly polarized laser beam by the Q-plate 23. The circularly polarized laser beam reaches the optical recording plane of the disk 27, at which point it is then reflected from the disk 27 and returns through the same optical path to the beam splitter 22. The phase of the laser beam is shifted by $\pi/2$ every time the laser beam passes through the Q-section plate 23; therefore, the phase of the reflected laser beam which reaches the beam splitter 22 is shifted by $\pi$ from the phase of the original laser beam. The reflected laser beam is again reflected from the reflection plane 30 of the beam splitter 22 so that it is reflected toward the light receiving element 29 which is provided above the beam splitter 22.

Figure 5:
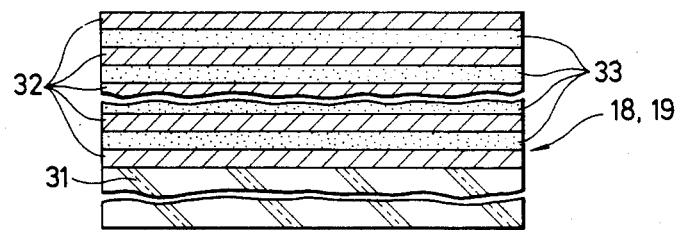
FIG. 5 is a cross-section of the fixed mirror shown in FIG. 3.

The fixed mirrors 18 and 19 are further constructed so that the attenuation of the linearly polarized laser beam is minimized. Specifically, a dielectric, multilayer, reflection film structure is utilized for forming the fixed mirrors. FIG. 5 shows an example of such a structure which is formed by alternately stacking a high refractive index film 32 and a low refractive index film 33 on a glass substrate 31. The optical film thickness of each of the high refractive index films 32 and each of the low refractive index films 33 corresponds to a quarter of the wavelength of the laser beam. The high refractive index films 32 are formed from a material such as ZnS (zinc sulfate) which has a refractive index of 2.30, and/or from $ZrO_2$ (zirconium oxide) which has a refractive index of 2.10. The low refractive index films 33 are formed from a material such as $MgF_2$ (magnesium fluoride) which has a refractive index of 1.78, and/or from $SiO_2$ (silicon dioxide) which has a refractive index of 1.46.

Figure 7:
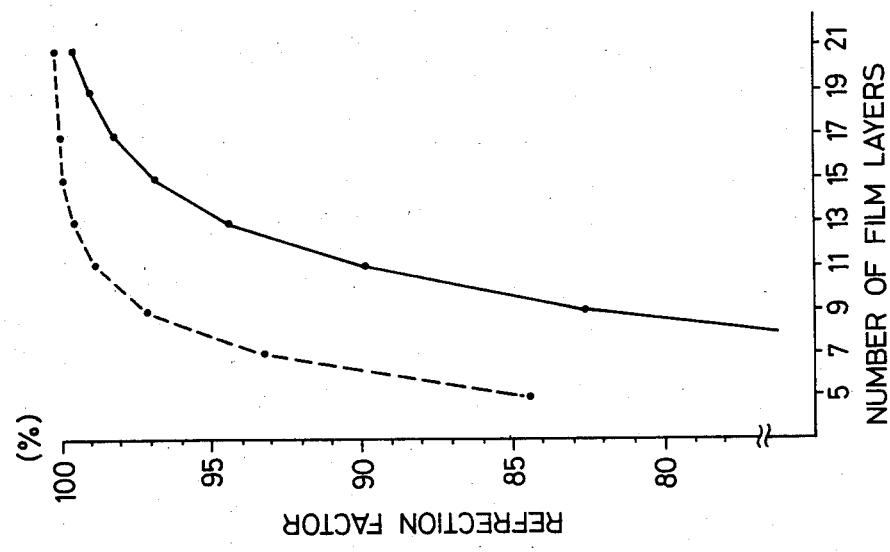
FIGS. 6 and 7 are reflection factor characteristic diagrams which illustrate reflection factors when the polarization reference plane is parallel to the linearly polarized, light oscillating plane and when the polarization reference plane is perpendicular to the linearly polarized, light oscillating plane.
Figure 6:
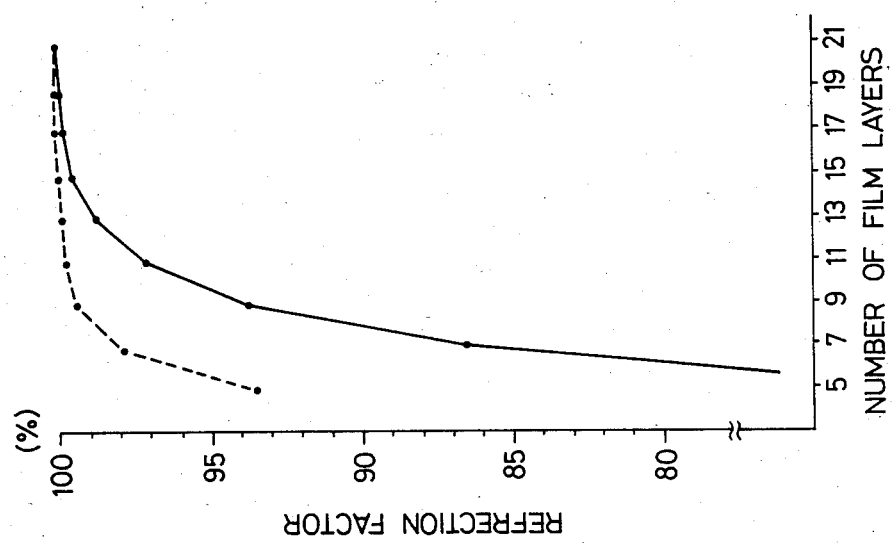

FIGS. 6 and 7 are reflection factor characteristic diagrams which show that the reflection factor at each of the fixed mirrors 18 and 19 varies, depending on whether the polarization reference plane R is parallel or perpendicular to the linearly polarized, light oscillating plane S. In the drawings, the abscissa and the ordinate represent the number of film layers and the reflection factor, respectively. FIG. 6 shows the difference in reflection factors between the case in which the polarization reference plane R is parallel to the linearly polarized, light oscillating plane S and the case in which the polarization reference plane R is perpendicular to the linearly polarized, light oscillating plane S when ZnS films and $MgF_2$ films are alternately formed in a stacked fashion on a glass substrate 31 which has a refractive index of 1.52. In FIG. 6, a solid line indicates the reflection factor for the case in which the polarization reference plane R is parallel to the linearly polarized, light oscillating plane S, while a broken line indicates the reflection factor for the case in which the polarization reference plane R is perpendicular to the linearly polarized, light oscillating plane S. Assuming that the reference reflection factor value is 99 percent, it is necessary to form at least 15 dielectric film layers on the glass substrate 31 when the polarization reference plane R is parallel to the linearly polarized, light oscillating plane S, while only nine dielectric film layers are required on the glass substrate 31 when the polarization reference plane R is perpendicular to the linearly polarized, light oscillating plane S. Thus, the number of film layers that must be stacked are reduced according to the apparatus of the present invention. Therefore, the apparatus of the present invention can be produced at a reduced cost.

FIG. 7 shows the difference in reflection factors between the case in which the polarization reference plane R is parallel to the linearly polarized, light oscillating plane S and the case in which the polarization reference plane R is perpendicular to the linearly polarized, light oscillating plane S when $ZrO_2$ films and $SiO_2$ films are alternately formed in a stacked fashion on a glass substrate 31 which has a refractive index of 1.52. In FIG. 7, a solid line indicates the reflection factor for the case in which the polarization reference plane R is parallel to the linearly polarized, light oscillating plane S, while a broken line indicates the reflection factor for the case in which the polarization reference plane R is perpendicular to the linearly polarized, light oscillating plane S. Assuming that the reference reflection factor value is 99 percent, it is necessary to form at least 21 dielectric film layers on the glass substrate 31 when the polarization reference plane R is parallel to the linearly polarized, light oscillating plane S, while only 13 dielectric film layers are required on the glass substrate 31 when the polarization reference plane R is perpendicular to the linearly polarized, light oscillating plane S.

As described above, according to the present invention, in the structure in which a fixed mirror is disposed in the optical path between a laser beam source and a beam splitter to cause the laser beam to advance toward the beam splitter, the laser beam source is arranged so that the polarization reference plane of the fixed mirror is perpendicular to the linearly polarized, light oscillating plane. It is thus possible to increase the efficiency of the fixed mirror. In addition, the beam splitter is arranged so that the polarization reference plane of the beam splitter is parallel to the linearly polarized, light oscillating plane so that it is possible to reduce the reflection of the laser beam from the beam splitter to the minimum amount possible. Therefore, the attenuation of the laser beam light in the optical path between the laser beam and the beam splitter is suppressed to a very low value.

In the embodiment described above, since the light receiving element is disposed above the beam splitter, the lateral length of the platform may be reduced. Alternatively, the light receiving element may be disposed under the beam splitter. According to either of these configurations, the size of the apparatus is made more compact.

I claim:
1. An apparatus for reading information from an optical recording medium, comprising:
 a laser beam source for generating a laser beam;
 a beam splitter; and
 at least one fixed mirror disposed in an optical path of said laser beam between said laser beam source and said beam splitter to reflect said laser beam toward said laser beam splitter;
 means for receiving said laser from said beam splitter and directing said laser beam at an optical recording medium for generating a reflected laser beam for information carrying light;
 means for receiving said information carrying light;
 said laser beam source being arranged so that a linearly polarized, light oscillating plane including an optical axis and an oscillating direction of said leaser beam is perpendicular to a plane including a normal of said fixed mirror and said optical axis of said laser beam;

wherein a plane including a normal of a reflection plane of said beam splitter and said optical axis of said laser beam is parallel to said linearly polarized, light oscillating plane;

said fixed mirror comprises a multi-layered, dielectric film structure formed by alternately stacking high refractive index films and low refractive index films on a glass substrate; and wherein said high refractive index films are made of zirconium oxide and said low refractive index films are made of silicon dioxide, and a number of said films is less than 14.

2. The apparatus as claimed in clam 1, further comprising a platform having two broad sides and a light receiving element;

said laser beam source, said beam splitter and said fixed mirror being fixed on said platform, said light receiving element being disposed kin a facing relationship with a side of said platform opposite from a side on which said laser beam source is mounted.

3. An apparatus for reading information from an optical recording medium, comprising:

a laser beam source for generating a laser beam;

a beam splitter; and at least one fixed mirror disposed in an optical path of said laser beam between said laser beam source and said beam splitter to reflect said laser beam toward said laser beam splitter;

means for receiving said laser from said beam splitter and directing said laser beam at an optical recording medium for generating a reflected laser beam for information carrying light;

means for receiving said information carrying light;

said laser beam source being arranged so that a linearly polarized, light oscillating plane including an optical axis and an oscillating direction of said laser beam is perpendicular to a plane including a normal of said fixed mirror and said optical axis of said laser beam;

wherein a plane including a normal of a reflection plane of said beam splitter and said optical axis of said laser beam is parallel to said linearly polarized, light oscillating plane;

said fixed mirror comprises a multi-layered, dielectric film structure formed by alternately stacking high refractive index films and low refractive index films on a glass substrate; and wherein said high refractive index films are made of zinc sulfate and said low refractive index films are made of magnesium fluoride, and a number of said films is less than 10.

4. The apparatus as claimed in claim 1 or 3, wherein an optical film thickness of each of said films equals a quarter of a wavelength of said laser beam.

5. The apparatus as claimed in claim 1 or 3, wherein said high refractive index films are formed of a material selected from the group consisting of zinc sulfate and zirconium oxide, and said low refractive index films are formed of a material selected from the group consisting of magnesium fluorodide and silicon dioxide.

6. The apparatus as claimed in claim 1 or 3, further comprising a platform having two broad sides and a light receiving element;

said laser beam source, said beam splitter and said fixed mirror being fixed on said platform, said light receiving element being disposed in a facing relationship with a side of said platform on which said laser beam is mounted.

7. The apparatus as claimed in claim 1 or 3, further comprising a platform having two broad sides and a light receiving element;

said laser beam source, said beam splitter and said fixed mirror being fixed on said platform, said light receiving element being disposed in a facing relationship with a side of said platform on which said laser beam is mounted.

8. The apparatus as claimed in claim 1 or 3, further comprising a platform having two broad sides and a light receiving element;

said laser beam source, said beam splitter and said fixed mirror being fixed on said platform, said light receiving element being disposed in a facing relationship with a side of said platform opposite from a side on which said laser beam source is mounted.

* * * * *